United States Patent [19]
Borgatti

[11] Patent Number: 5,957,472
[45] Date of Patent: Sep. 28, 1999

[54] APPARATUS FORMING A COMBINED HAND TRUCK AND MACHINE STAND

[75] Inventor: Anthony J. Borgatti, East Longmeadow, Mass.

[73] Assignee: Power Tool Specialists, Inc., East Windsor, Conn.

[21] Appl. No.: 08/904,214

[22] Filed: Jul. 31, 1997

[51] Int. Cl.⁶ .................................................. B62B 1/02
[52] U.S. Cl. .................. 280/30; 280/47.24; 280/47.27; 280/47.28; 280/47.29
[58] Field of Search .................................. 280/30, 47.19, 280/47.24, 47.25, 47.27, 47.28, 47.33, 639, 38, 641, 651, 652

[56] References Cited

U.S. PATENT DOCUMENTS

| | | | |
|---|---|---|---|
| 4,185,853 | 1/1980 | Thurmond, Jr. | 280/47.29 |
| 4,284,286 | 8/1981 | Lewallen | 280/30 |
| 4,565,382 | 1/1986 | Sherman | 280/47.18 |
| 4,632,412 | 12/1986 | Nasgowitz | 280/47.26 |
| 4,969,660 | 11/1990 | Spak | 280/47.29 |
| 5,161,811 | 11/1992 | Cheng | 280/30 |
| 5,356,197 | 10/1994 | Simic | 297/129 |
| 5,529,322 | 6/1996 | Barton | 280/30 |
| 5,542,740 | 8/1996 | Chang | 297/129 |

*Primary Examiner*—Richard M. Camby
*Attorney, Agent, or Firm*—Cummings & Lockwood

[57] ABSTRACT

In an apparatus forming a combined hand truck and machine stand, a first frame support is pivotally coupled to a second frame support for movement between a first position forming a hand truck and a second position forming a machine stand. A machine support is pivotally coupled to the first frame support and is movable relative thereto between a first position forming the hand truck and a second position forming the machine stand. A base plate is pivotally coupled to a lower portion of the first frame support, and is movable between a first position pivoted outwardly relative to the first frame support and locked in place to prevent the apparatus from toppling when in the form of a hand truck, and a second position pivoted inwardly relative to the first frame support when the apparatus is in the form of a machine stand. The second frame support includes a pair of legs and a cross-piece support extending between and coupled for rotation to each leg. A plate defining a flat surface for engaging the machine support is fixed to the cross-piece support, and a handle is coupled to, and extends outwardly from the plate. When the apparatus is in the form of a hand truck, the plate engages the machine support to thereby prevent rotation of the cross-piece support and allow the handle to be used to move the hand truck. When the apparatus is configured as a machine stand, the cross-piece support forms a buttress for contacting and supporting the machine support.

23 Claims, 2 Drawing Sheets

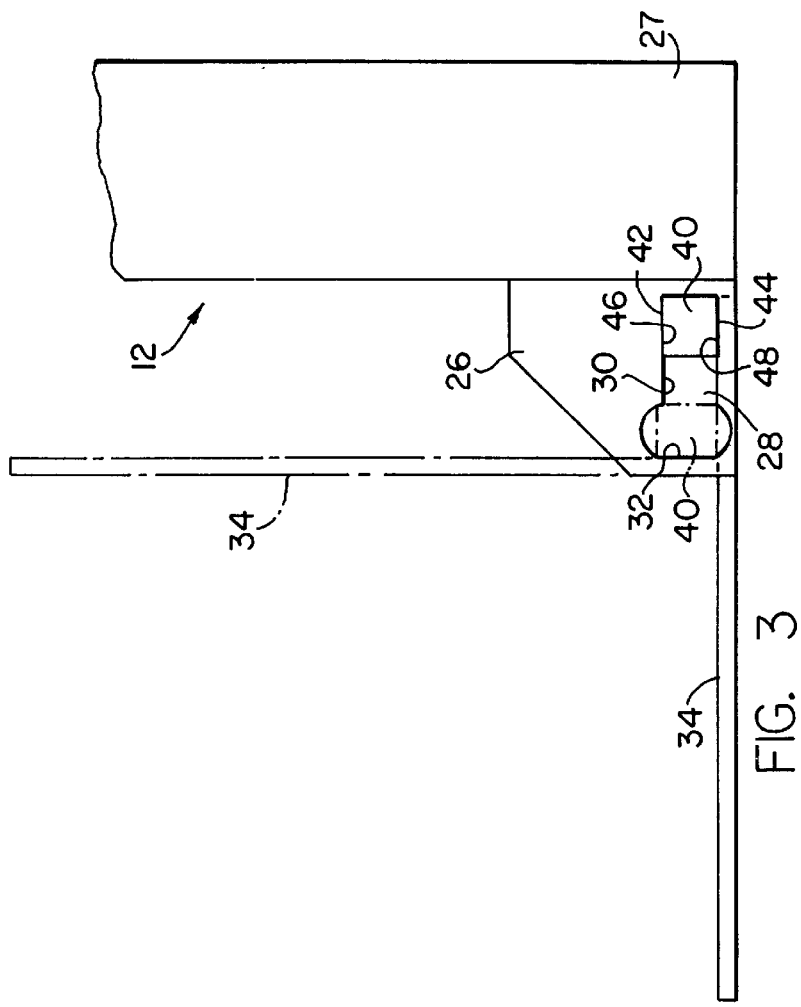
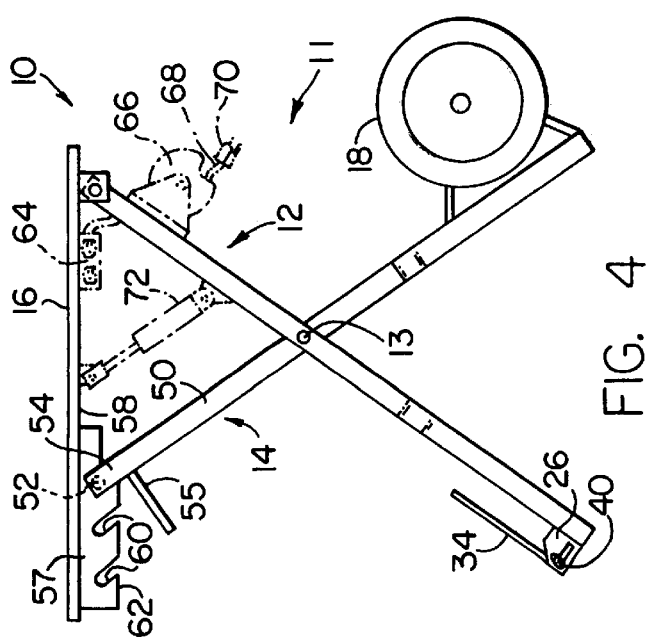

APPARATUS FORMING A COMBINED HAND TRUCK AND MACHINE STAND

FIELD OF THE INVENTION

The present invention relates generally to apparatus for manually transporting and supporting machinery, and more particularly to hand trucks, machine stands, and combinations thereof for transporting and supporting machinery, such as power tools.

BACKGROUND OF THE INVENTION

Power tools and like machines, such as drill presses, table saws and grinders, are often needed to perform work operations in more than one location. Due to their cumbersome nature and uneven weight distribution, transporting these machines from place-to-place can be difficult, often requiring more than one worker, or the use of a hand truck. When a hand truck is employed, the machine is frequently supported on a base plate of the truck in an unsecured manner, creating the potential for damage to the machine if it falls off.

Once the machine is transported to a desired location, it must be positioned for use. This can require that the machine be placed on a level surface or be securely fastened to a table or a machine stand. However, depending on the particular location, these conditions may not be available and something less than ideal might have to be settled for. In any event, a worker must lift the machine off of the hand truck and into an operating position, creating a risk of injury to the worker. The potential for injury is further exacerbated if the machine must be operated in a position that is less then ideal, as described above.

Accordingly, it is an object of the present invention to provide an apparatus forming a combined hand truck and machine stand for overcoming the above-described drawbacks and disadvantages of the prior art.

SUMMARY OF THE INVENTION

The present invention is directed to an apparatus forming a combined hand truck and machine stand, including a frame having a first frame support and a second frame support coupled to the first frame support and moveable relative thereto between a first position forming a hand truck and a second position forming a machine stand. A machine support is coupled to at least one of the first and second frame supports and moveable relative thereto also between a first position forming the hand truck and a second position forming the machine stand. A pair of wheels are rotatably coupled to one of the first and second frame supports for transporting the apparatus with each of the frame and machine supports in the first position forming the hand truck.

The present invention also includes means for preventing the apparatus from toppling when each of the first and second frame supports and machine support are in the first position forming the hand truck. In a preferred embodiment of the invention, this means includes a base plate pivotally coupled to a lower section of the first frame support for movement relative thereto between a first position pivoted outwardly relative to the first frame support, and a second position pivoted inwardly toward to the first frame support. The apparatus also includes means for locking the base plate in the first position to thereby prevent the apparatus from toppling under the weight of a machine mounted thereon when in the first position forming the hand truck.

The apparatus may also include means for fixedly securing a machine, such as a power tool, to the machine support in the first and second positions. The means for securing preferably comprises a plurality of holes defined by the machine support, which are positioned in predetermined locations corresponding to a mounting hole pattern of one or more power tools or like machines, and are adapted to receive fasteners for fixedly securing the machines to the support.

Also in the preferred embodiment, the second frame support comprises a pair of legs spaced relative to each other, and a cross-piece support extending between and rotatably coupled to an upper section of each leg. A plate defining an approximately flat support surface for engaging the machine support is fixed to the cross-piece support, and a handle is coupled to the plate. When the first and second frame supports and the machine support are in the first position forming the hand truck, the support surface of the plate engages the machine support in order to prevent the cross-piece support from rotating, and in turn allow the handle to be used to move the hand truck. When the first and second frame supports and the machine support are in the second position forming the machine stand, the cross-piece support forms a buttress for the machine support.

The apparatus of the invention also preferably includes means for selectively adjusting the height of the machine support when each of the first and second frame supports and machine support are in the second position forming the machine stand. Preferably, at least one bracket is coupled to an underside of the machine support and defines a plurality of slots spaced relative to each other along the length of the bracket. Each slot is adapted to receive the cross-piece support when the apparatus is in the second position forming the machine stand. To adjust the height of the machine stand, the cross-piece support is selectively positioned in a slot corresponding to a desired height.

One advantage of the present invention is that the apparatus functions both as a hand truck for transporting a machine from location to location and as a machine stand.

Another advantage of the present invention is that the apparatus will not ordinarily topple when a machine is attached to the machine support and the apparatus is used as a hand truck.

Yet another advantage of the present invention is that the height of the apparatus when used as a machine stand is adjustable to accommodate different size machines, and/or the height of the machine operator.

BRIEF DESCRIPTION OF THE DRAWINGS

These and other features, aspects and advantages of the present invention will become clear with regard to the following description, appended claims, and accompanying drawings where:

FIG. 3 is a partial side elevational view of the apparatus of FIG. 1 illustrating the mounting bracket and base plate for forming the hand truck; and FIG. 4 is a side elevational view taken from the left side of the apparatus of FIG. 1, shown in another second position forming the machine stand.

DETAILED DESCRIPTION OF THE PREFERRED EMBODIMENT

Figure 1:
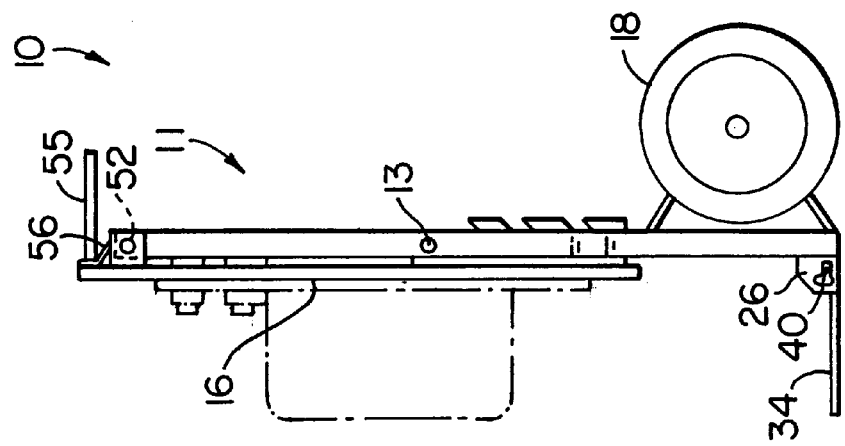
FIG. 1 is a side elevational view of an apparatus embodying the present invention shown in a first position forming a hand truck.
Figure 2:
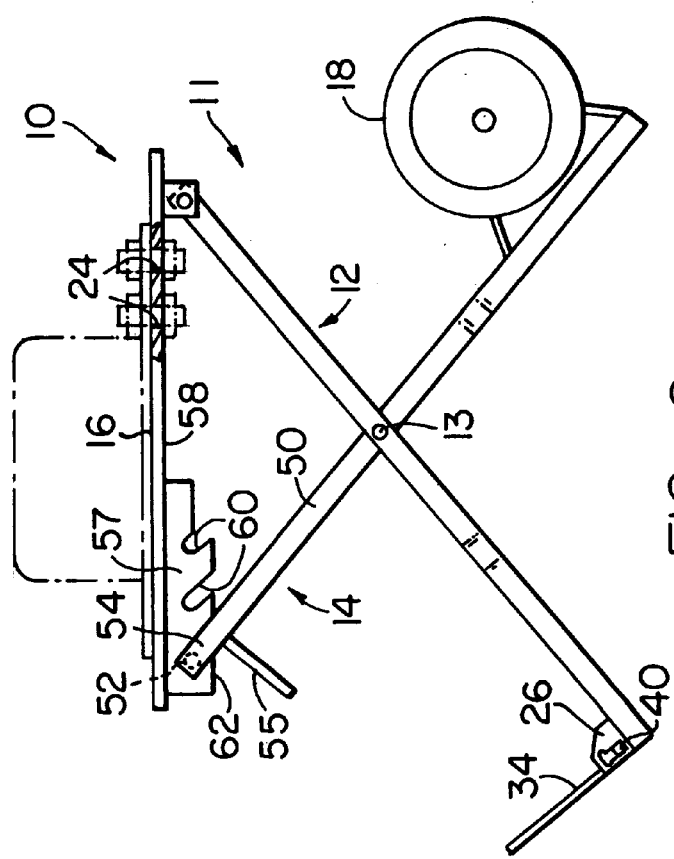
FIG. 2 is a side elevational view taken from the left side of the apparatus of FIG. 1, shown in a second position forming a machine stand.

As shown in FIGS. 1 and 2, an apparatus embodying the present invention forming a combined hand truck and machine stand is indicated generally by the reference numeral 10. The apparatus 10 includes a frame 11 having a first frame support 12 pivotally coupled by a shaft 13 to a second frame support 14 and moveable relative thereto between a first position forming a hand truck, as shown in FIG. 1, and a plurality of second positions forming a machine stand, as shown typically in FIGS. 2 and 4. A machine support 16 is coupled to the first frame support 12, and a pair of wheels 18 are rotatably coupled to the second frame support 14 for use when the first and second frame supports and the machine support are in the first position forming the hand truck.

The apparatus 10 can also include means for fixedly securing a machine to the machine support 16, which in the embodiment illustrated in FIG. 1 comprises a plurality of holes 24 defined by and positioned at predetermined locations along the machine support. The pattern of the holes 24 corresponds to the mounting hole patterns of one or more power tools or like machines, shown schematically in broken lines in FIGS. 1 and 2. As also shown typically in broken lines in FIGS. 1 and 2, a plurality of fasteners are received through the mounting holes 24 to fixedly secure the machine to the machine support. While the means for fixedly securing a machine to the machine support 16 has been described as including a plurality of holes 24, the invention is not limited in this regard as other means for securing the machine to the machine support could equally be employed. For example, any of a numerous different types of clamps, such as toggle or "C" type clamps, or mounting brackets, could be employed without departing from the broader aspects of the present invention.

In addition, the apparatus 10 includes means for preventing the apparatus from toppling when each of the first and second frame supports, 12 and 14 respectively, and the machine support 16 having a machine mounted thereon, are in the first position forming the hand truck. As shown typically in FIG. 3, this means includes a pair of brackets 26 spaced relative to each other and mounted to a lower section 27 of the first frame support 12 (only one shown). The brackets 26 each define a slot 28 having an elongated portion 30 and a relatively expanded portion 32, and shown in FIG. 3, the two slots are aligned with each other. A base plate 34 is positioned between the brackets 26 and includes a pair of mounting pins 40 (only one shown) extending from the base plate and adapted to be slidably received in the slots 28. As shown in broken lines in FIG. 3, the base plate 34 is moveable between a first position pivoted outwardly relative to the first frame support 12 in order to form the hand truck, and a second position pivoted inwardly relative to the first frame support when forming a machine stand. When in the first position, the mounting pins 40 are slidably located in the elongated portion 30 of the slot 28. To move the base plate 34 from the first to the second position, the base plate is pulled outwardly from the first frame support 12 to thereby slide the pins 40 through the elongated portions 30 and into the relatively expanded portions 32 of the slots 28. Once in the expanded portions 32, the pins 40 are free to rotate and thereby allow the base plate to be pivoted upwardly into the second position when the apparatus is functioning as a machine stand, as shown in broken lines in FIG. 3.

In the illustrated embodiment, the mounting pins 40 define upper and lower flat surfaces 42 and 44 respectively, such that when the base plate 34 is in the first position and the mounting pins 40 are located in the elongated portions 30 of the slots 28, the upper and lower flat surfaces slidably engage upper and lower edges 46 and 48 of the elongated portions of the slots, thereby locking the base plate in the first position forming the hand truck and preventing the apparatus from toppling under the weight of a machine mounted thereon, as shown typically in FIG. 1.

As shown in FIG. 4, the second frame support 14 comprises a pair of legs 50 (only one shown) spaced relative to each other, and a cross-piece support 52 extending between and rotatably coupled to an upper section 54 of each leg. As shown in FIG. 1, a handle 55 is coupled to a plate 56, and the plate is fixed to the cross-piece support 52. As can be seen, the plate 56 defines an approximately flat support surface adapted to engage the back or underside of the machine support 16. Accordingly, when the first and second frame supports, 12 and 14 respectively, and the machine support 16 are in the first position forming the hand truck, the handle 55 extends outwardly from the machine support 16 with the support surface of the plate 56 engaging the machine support, thereby preventing the cross-piece support 52 from rotating, and in turn allowing the handle to be used to operate the hand truck. Conversely, as shown in FIG. 2, when the first and second frame supports, 12 and 14 respectively, and the machine support 16 are in the second position forming the machine stand, handle 55 is free to rotate downwardly while the crosspiece support 52 is received within a selected slot to buttress the machine support, as is described further below.

Still referring to FIG. 4, the first and second frame supports, 12 and 14 respectively, and the machine support 16 are retained in the second position forming a machine stand by a pair of brackets 57 (only one shown) mounted to an underside 58 of the machine support 16. The brackets 57 are spaced apart relative to one another across the underside 58 of the machine support 16, with each bracket defining a plurality of slots 60 extending along the length of and part-way into the bracket from a lower edge 62, whereby each of the slots 60 in one bracket 57 is aligned with a corresponding slot in the other bracket. As shown typically in FIGS. 2 and 4, the slots 60 are adapted to receive the cross-piece support 52 to thereby releasably retain the apparatus 10 in a selected second position forming the machine stand.

In addition, and as shown in FIGS. 2 and 4, the brackets 57 and the cross-piece support 52 can also be used to adjust the height of the machine stand. By selectively positioning the cross-piece support 52 in the desired slots 60, the machine stand can be selectively adjusted from a lower position illustrated in FIG. 2, to a higher position illustrated typically in FIG. 4.

As also illustrated in broken lines in FIG. 4, the apparatus 10 may include an electrical receptacle 64 electrically coupled to a cord reel 66 mounted to one of the first or second frame supports, 12 or 14 respectively. The cord reel 66 includes a length of cable 68 retractably wound thereon and terminating in a connector 70, preferably in the form of a plug. A machine mounted on the machine support 16 can be plugged into the receptacle 64, and the connector 70 electrically coupled to a power supply, thereby providing the power necessary to operate the machine.

In addition, at least one air cylinder 72, also shown in phantom in FIG. 4, can be pivotally coupled at one end to the machine support 16 and at another end to one of the first or second frame supports, 12 or 14. When a machine secured to the machine support 16 is moved from the first position forming a hand truck to the second position forming a machine stand, the air cylinder 72 will aid an operator in lifting the machine.

To move a machine from one location to another, and to position the machine for operation, the machine is first secured to the machine support. With the first and second frame supports, 12 and 14 respectively, and the machine support 16 in the first position forming the hand truck, and also with the base plate 34 releasably secured in the first position to prevent the apparatus from toppling, a worker can transport the machine by grasping the handle 55 and pushing the apparatus to the desired location. Once the location has been reached, the apparatus can be converted into the machine stand, as shown typically in FIGS. 2 and 4, and set at a desired height by moving the first and second frame supports, 12 and 14 respectively, and the machine support 16 with the machine mounted thereon to the second position, and selectively positioning the cross-piece support 52 into the slots 60 corresponding to the desired height.

While preferred embodiments have been shown and described, various modifications and substitutions may be made without departing from the spirit and scope of the invention. Accordingly, it is to be understood that the present invention has been described by way of example, and not by limitation.

What is claimed is:

1. An apparatus forming a combined hand truck and machine stand, comprising:
   a frame including a first frame support and a second frame support coupled to the first frame support and moveable relative thereto between a first position forming a hand truck and a second position forming a machine stand;
   a machine support coupled to at least one of the first and second frame supports and moveable relative thereto between a first position forming the hand truck and a second position forming the machine stand;
   at least one wheel coupled to one of the first and second frame supports for transporting the apparatus with each of the frame and machine supports in the first position forming the hand truck; and
   means for preventing the apparatus from toppling with each of the first and second frame supports and machine support in the first position forming the hand truck mounted on the other of the first and the second frame supports.

2. An apparatus forming a combined hand truck and stand as defined by claim 1, wherein the first frame support is pivotally coupled to the second frame support.

3. An apparatus forming a combined hand truck and stand as defined by claim 1, wherein the machine support is pivotally coupled to one of the first and second frame supports.

4. An apparatus forming a combined hand truck and stand as defined by claim 1, further comprising:
   means for fixedly securing a machine to the machine support in the first and second positions.

5. An apparatus forming a combined hand truck and machine stand comprising:
   a frame including a first frame support and a second frame support coupled to the first frame support and moveable relative thereto between a first position forming a hand truck and a second position forming a machine stand;
   a machine support coupled to at least one of the first and second frame supports and moveable relative thereto between a first position forming the hand truck and a second position forming the machine stand;
   at least one wheel coupled to one of the first and the second frame supports for transporting the apparatus with each of the frame and machine supports in the first position forming the hand truck; and
   means for preventing the apparatus from toppling with each of the first and second frame supports and machine support in the first position forming the hand truck, wherein the means for preventing the apparatus from toppling includes:
      a base plate pivotally coupled to a lower section of at least one of the first and second frame supports for movement between a first position wherein the base plate is pivoted outwardly relative the frame support, and a second position wherein the base plate is pivoted inwardly relative to the frame support; and
   means for retaining the base plate in the first position.

6. An apparatus forming a combined hand truck and stand as defined by claim 5, wherein the means for retaining the base plate in the first position comprises:
   at least one bracket coupled to the lower section of a first frame support and defining a slot having an elongated portion and a relatively expanded portion; and
   at least one mounting member extending outwardly from the base plate and defining at least two approximately flat support surfaces located on opposite sides of the mounting member relative to each other and slidably received within the slot to thereby prevent rotation of the mounting member within the elongated portion of the slot.

7. An apparatus forming a combined hand truck and stand as defined by claim 4, wherein the means for fixedly securing a machine to the machine support includes a plurality of mounting holes defined by the machine support and spaced relative to each other at predetermined locations corresponding a mounting hole pattern of one or more machines.

8. An apparatus forming a combined hand truck and stand as defined by claim 1, wherein:
   the machine support is coupled to the first frame support; and
   the second frame support includes a pair of legs and a cross-piece support extending between an upper section of each leg, wherein the cross-piece support contacts and supports the machine support with the first and second frame supports in the second position.

9. An apparatus forming a combined hand truck and stand as defined by claim 8, further comprising:
   a handle support coupled to and projecting outwardly from the cross-piece support for engaging the machine support in the first position; and
   a handle coupled to and extending outwardly from the handle support for moving the machine with the first and second frame supports and the machine support in the first position forming the hand truck.

10. An apparatus forming a combined hand truck and stand as defined by claim 1, further comprising:
   means for selectively adjusting the height of the machine support with each of the first and second frame supports and machine support in the second position forming the machine stand.

11. An apparatus forming a combined hand truck and machine stand comprising:
   a frame including a first frame support and a second frame support coupled to the first frame support and moveable relative thereto between a first position forming a hand truck and a second position forming a machine stand;

a machine support coupled to at least one of the first and second frame supports and moveable relative thereto between a first position forming the hand truck and a second position forming the machine stand;

at least one wheel coupled to one of the first and the second frame supports for transporting the apparatus with each of the frame and machine supports in the first position forming the hand truck; and means for preventing the apparatus from toppling with each of the first and second frame supports and machine support in the first position forming the hand truck;

means for selectively adjusting the height of the machine support with each of the first and second frame supports and machine support in the second position forming the machine stand, wherein:

the machine support is coupled to the first frame support;

the second frame support includes a pair of legs and a cross-piece support extending between the two legs; and wherein the means for selectively adjusting the height of the machine support includes at least one bracket coupled to an underside of the machine support and defining a plurality of slots spaced relative to each other therein; and the cross-piece support is selectively receivable in each slot to position the machine support at a height corresponding to the slot.

12. An apparatus forming a combined hand truck and machine stand comprising:

a frame including a first frame support and a second frame support coupled to the first frame support and moveable relative thereto between a first position forming a hand truck and a second position forming a machine stand;

a machine support coupled to at least one of the first and second frame supports and moveable between a first position and a second position forming the machine stand;

at least one wheel coupled to one of the first and the second frame supports for transporting the apparatus with each of the frame and machine supports in the first position forming the hand truck;

a base plate pivotally coupled to a lower section of the other of the first and second frame supports for movement between a first position wherein the base plate is pivoted outwardly relative the frame support forming the hand truck, and a second position wherein the base plate is pivoted inwardly relative to the frame support forming the machine stand.

13. An apparatus forming a combined hand truck and machine stand comprising:

a frame including a first frame support and a second frame support coupled to the first frame support and moveable relative thereto between a first position forming a hand truck and a second position forming a machine stand;

a machine support coupled to at least one of the first and second frame supports and moveable between a first position and a second position forming the machine stand;

at least one wheel coupled to one of the first and the second frame supports for transporting the apparatus with each of the frame and machine supports in the first position forming the hand truck;

a base plate pivotally coupled to a lower section of at least one of the first and second frame supports for movement between a first position wherein the base plate is pivoted outwardly relative the frame support forming the hand truck, and a second position wherein the base plate is pivoted inwardly relative to the frame support forming the machine stand;

at least one bracket coupled to the lower section of the first frame support, and defining a slot having an elongated portion and a relatively expanded portion; and at least one mounting member extending outwardly from the base plate and defining at least two approximately flat support surfaces located on opposite sides of the mounting member relative to each other and slidably received within the slot to thereby prevent rotation of the mounting member within the elongated portion of the slot.

14. An apparatus forming a combined hand truck and stand as defined by claim 12, wherein:

the support surface is coupled to the first frame support; and the second frame support includes a pair of legs and a cross-piece support extending between an upper section of the legs and buttressing the support surface with the first and second frame supports and in the second position forming the machine stand.

15. An apparatus forming a combined hand truck and machine stand as defined by claim 14, further comprising:

a handle support coupled to and projecting outwardly from the cross-piece support for engaging the machine support in the first position; and a handle coupled to and extending outwardly from the handle support for moving the machine with the first and second frame supports and machine support in the first position forming the hand truck.

16. An apparatus forming a combined hand truck and surface stand as defined by claim 12, wherein the surface support defines a plurality of holes positioned at predetermined locations corresponding to a mounting hole pattern of at least one machine.

17. An apparatus forming a combined hand truck and machine stand as defined by claim 1 wherein the means for preventing the apparatus from toppling includes:

a base plate pivotally coupled to a lower section of at least one of the first and second frame supports for movement between a first position wherein the base plate is pivoted outwardly relative the frame support, and a second position wherein the base plate is pivoted inwardly relative to the frame support; and means for retaining the base plate in the first position.

18. An apparatus forming a combined hand truck and machine stand as defined by claim 17, wherein the means for retaining the base plate in the first position comprises:

at least one bracket coupled to the lower section of a first frame support and defining a slot having an elongated portion and a relatively expanded portion; and at least one mounting member extending outwardly from the base plate and defining at least two approximately flat support surfaces located on opposite sides of the mounting member relative to each other and slidably received within the slot to thereby prevent rotation of the mounting member within the elongated portion of the slot.

19. An apparatus forming a combined hand truck and machine stand as defined by claim 10, wherein:

the machine support is coupled to the first frame support;

the second frame support includes a pair of legs and a cross-piece support extending between the two legs; and wherein the means for selectively adjusting the height of the machine support includes at least one bracket coupled to an underside of the machine support and defining a plurality of slots spaced relative to each other therein; and the cross-piece support is selectively receivable in each slot to position the machine support at a height corresponding to the slot.

20. An apparatus forming a combined hand truck and machine stand as defined by claim 12, further comprising:

at least one bracket coupled to the lower section of the first frame support, and defining a slot having an elongated portion and a relatively expanded portion; and at least one mounting member extending outwardly from the base plate and defining at least two approximately flat support surfaces located on opposite sides of the mounting member relative to each other and slidably received within the slot to thereby prevent rotation of the mounting member within the elongated portion of the slot.

21. An apparatus forming a combined hand truck and machine stand as defined by claim 1, wherein the at least one wheel and the means for preventing the apparatus from toppling face outwardly with respect to the frame members and in opposite directions.

22. A combined hand truck and stand comprising:

a frame including a first frame support and a second frame support pivotally coupled to the first frame support and moveable relative thereto between a first position forming a hand truck and a second position forming a machine stand;

a machine support pivotally mounted to one end of the first frame support and moveable relative thereto between a first position forming the hand truck and a second position forming the machine stand;

a plate for preventing the hand truck from toppling when in the first position forming the hand truck, the plate extending from an opposite end of the first frame support; and at least one wheel coupled to the second frame support for transporting the hand truck when in the first position.

23. An apparatus forming a combined hand truck and machine stand as defined by claim 22, wherein the at least one wheel and the plate face outwardly with respect to the frame members and in opposite directions.

* * * * *